US008725600B2

(12) United States Patent
Levy

(10) Patent No.: US 8,725,600 B2
(45) Date of Patent: May 13, 2014

(54) STORAGE LOCKER

(71) Applicant: Laundry Locker, Inc., San Francisco, CA (US)

(72) Inventor: Arik Seth Levy, San Francisco, CA (US)

(73) Assignee: Laundry Locker, Inc., San Francisco, CA (US)

( * ) Notice: Subject to any disclaimer, the term of this patent is extended or adjusted under 35 U.S.C. 154(b) by 0 days.

(21) Appl. No.: 13/723,100

(22) Filed: Dec. 20, 2012

(65) Prior Publication Data

US 2013/0113345 A1   May 9, 2013

Related U.S. Application Data

(63) Continuation of application No. 13/136,617, filed on Aug. 28, 2011, now Pat. No. 8,359,249, and a continuation-in-part of application No. 12/925,282, filed on Oct. 18, 2010, now Pat. No. 8,401,932, which is a continuation of application No. 11/386,528, filed on Mar. 22, 2006, now Pat. No. 7,844,507.

(51) Int. Cl.
| | |
|---|---|
| G06Q 10/00 | (2012.01) |
| G06Q 30/00 | (2012.01) |
| G06Q 50/00 | (2012.01) |
| A47B 49/00 | (2006.01) |
| E06B 3/50 | (2006.01) |
| A47B 88/00 | (2006.01) |
| A47B 87/00 | (2006.01) |
| A47B 53/00 | (2006.01) |
| A47B 77/00 | (2006.01) |
| A47B 95/00 | (2006.01) |

(52) U.S. Cl.
USPC ............ 705/28; 416/805; 705/15; 312/109; 312/324; 312/326; 312/199

(58) Field of Classification Search
USPC ............ 705/28; 416/805; 312/215, 109, 324, 312/326, 199
See application file for complete search history.

(56) References Cited

U.S. PATENT DOCUMENTS

| | | | | | |
|---|---|---|---|---|---|
| 3,679,280 | A | * | 7/1972 | Friederich et al. | 312/6 |
| 3,819,246 | A | * | 6/1974 | List | 312/265.1 |
| 4,153,313 | A | * | 5/1979 | Propst | 312/211 |
| 4,344,660 | A | * | 8/1982 | Molnar et al. | 312/249.13 |
| 4,403,701 | A | * | 9/1983 | Corcoran | 211/133.1 |
| 4,793,664 | A | * | 12/1988 | Jackson | 312/306 |
| 5,178,444 | A | * | 1/1993 | May et al. | 312/265.3 |
| 5,191,978 | A | * | 3/1993 | Strader et al. | 206/315.2 |
| 5,372,415 | A | * | 12/1994 | Tisbo et al. | 312/108 |

(Continued)

OTHER PUBLICATIONS

Sycamore Systems publication (Merican Drycleaner 71, 4, 35(28), Jul. 2004).*

(Continued)

*Primary Examiner* — Matthew Gart
*Assistant Examiner* — Harshad Parikh
(74) *Attorney, Agent, or Firm* — David Lewis

(57) ABSTRACT

In an embodiment, articles are left in storage areas, such as lockers or other receptacles that may be associated with a household services company. A divided storage receptacle is discussed. The receptacle is divided by an angled plane such that the top portion may be used to hang clothes of various lengths thereby utilizing the space efficiently.

24 Claims, 10 Drawing Sheets

(56) References Cited

U.S. PATENT DOCUMENTS

| | | | |
|---|---|---|---|
| 5,449,230 A * | 9/1995 | Murray | 312/285 |
| 5,472,309 A * | 12/1995 | Bernard et al. | 414/807 |
| 5,690,234 A * | 11/1997 | Rhead et al. | 211/22 |
| 5,713,650 A * | 2/1998 | King et al. | 312/265.4 |
| 5,951,126 A * | 9/1999 | Wolff et al. | 312/199 |
| 7,693,745 B1 * | 4/2010 | Pomerantz et al. | 705/26.5 |
| 7,828,399 B1 * | 11/2010 | Bass | 312/199 |
| 7,844,507 B2 * | 11/2010 | Levy | 705/28 |
| 2002/0046133 A1 * | 4/2002 | Sheth | 705/26 |
| 2002/0130597 A1 * | 9/2002 | Newberry et al. | 312/199 |
| 2004/0164655 A1 * | 8/2004 | Wood et al. | 312/205 |
| 2006/0232175 A1 * | 10/2006 | Fromme et al. | 312/326 |
| 2007/0250409 A1 * | 10/2007 | Levy | 705/28 |
| 2008/0018210 A1 * | 1/2008 | Hayes | 312/215 |
| 2008/0185946 A1 * | 8/2008 | Meckert et al. | 312/259 |
| 2008/0238277 A1 * | 10/2008 | Geng | 312/326 |
| 2009/0278426 A1 * | 11/2009 | Vinke | 312/215 |
| 2010/0026147 A1 * | 2/2010 | Mackillop | 312/215 |
| 2010/0106291 A1 * | 4/2010 | Campbell et al. | 700/231 |
| 2010/0201234 A1 * | 8/2010 | Heimler et al. | 312/222 |
| 2011/0169386 A1 * | 7/2011 | Hardy et al. | 312/246 |
| 2012/0141247 A1 * | 6/2012 | Levy | 414/806 |

OTHER PUBLICATIONS

Closet space goes upscale by Nancy Dillon, New York daily News, New York, NY, Nov. 26, 2001 p. 39.*

Hanging around by Victoria O'Brien, Sunday Times, London, Jun. 27, 2004 p. 16.*

Sycamore System Publication (American Drycleaner 71,4,35(28), Jul. 2004.*

* cited by examiner

STORAGE LOCKER

CROSS REFERENCE TO RELATED APPLICATIONS

This application is a continuation of U.S. Non-Provisional patent application Ser. No. 13/136,617, entitled "Storage Locker," filed Aug. 28, 2011,
which in turn is a continuation-in-part of U.S. Non-Provisional patent application Ser. No. 12/925,282, entitled "HANDLING HOUSEHOLD TASKS," filed Oct. 18, 2010, by Arik Seth Levy,
which in turn is a continuation of U.S. Non-Provisional patent application Ser. No. 11/386,528, entitled "HANDLING HOUSEHOLD TASKS," by Arik Seth Levy, filed Mar. 22, 2006;
this application is separately a continuation-in-part of U.S. Non-Provisional patent application Ser. No. 12/925,282, entitled "HANDLING HOUSEHOLD TASKS," filed Oct. 18, 2010, by Arik Seth Levy,
which in turn is a continuation of U.S. Non-Provisional patent application Ser. No. 11/386,528, entitled "HANDLING HOUSEHOLD TASKS," by Arik Seth Levy, filed Mar. 22, 2006; and each of the above listed applications is incorporated herein by reference.

FIELD OF THE INVENTION

The specification relates generally to lockers.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. In general, lockers that are rectangular in shape have a flat ceiling and a flat floor.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Although the issues discussed in the background or elsewhere may have motivated some of the subject matter disclosed below, nonetheless, the embodiments disclosed below do not necessarily solve all of the problems associated with the subject matter discussed in the background or elsewhere. Some embodiments only address one of the problems, and some embodiments do not solve any of the problems associated with the subject matter discussed in the background or elsewhere.

Figure 1:
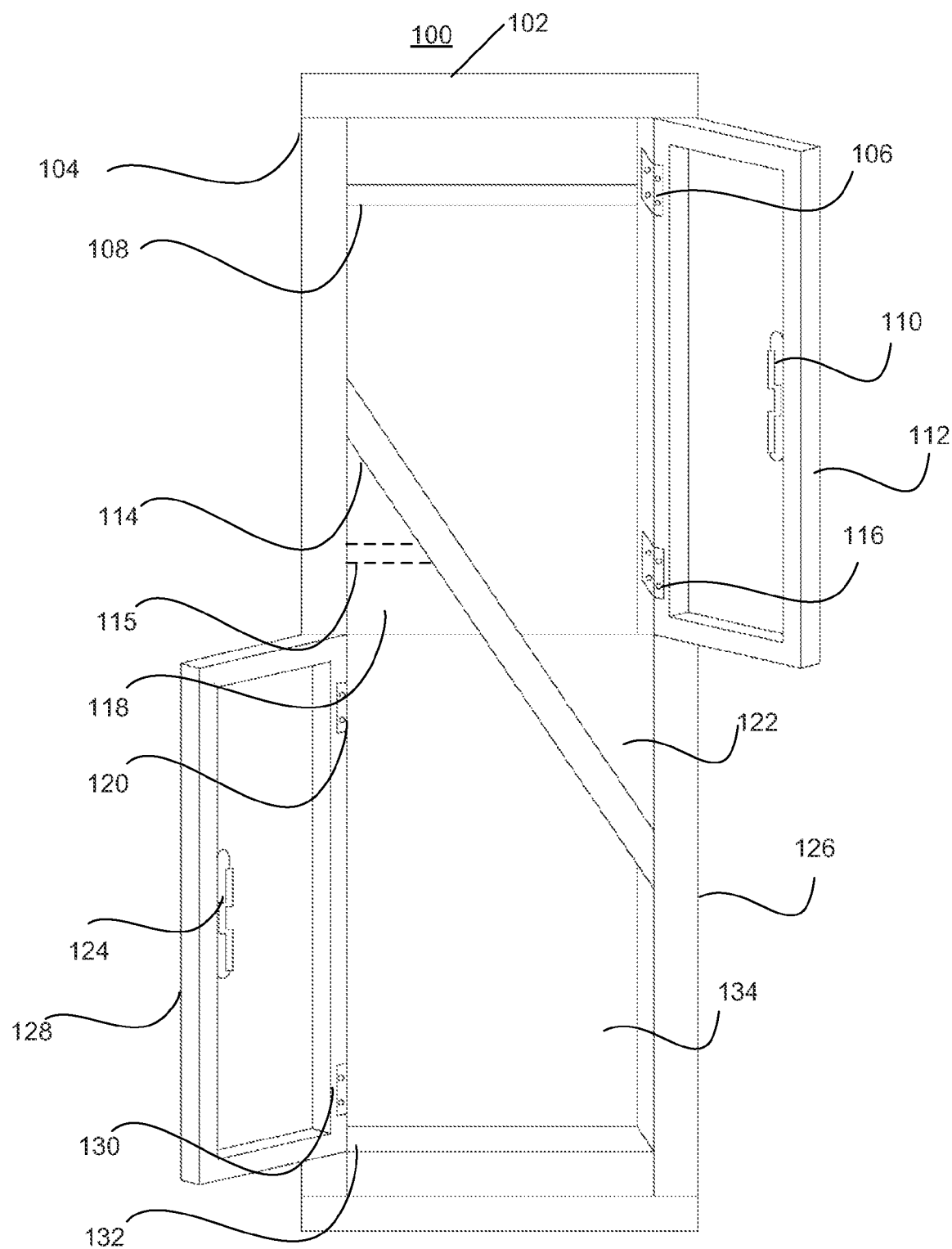
FIG. 1 is a front view of an embodiment of the storage locker.
Figure 2:
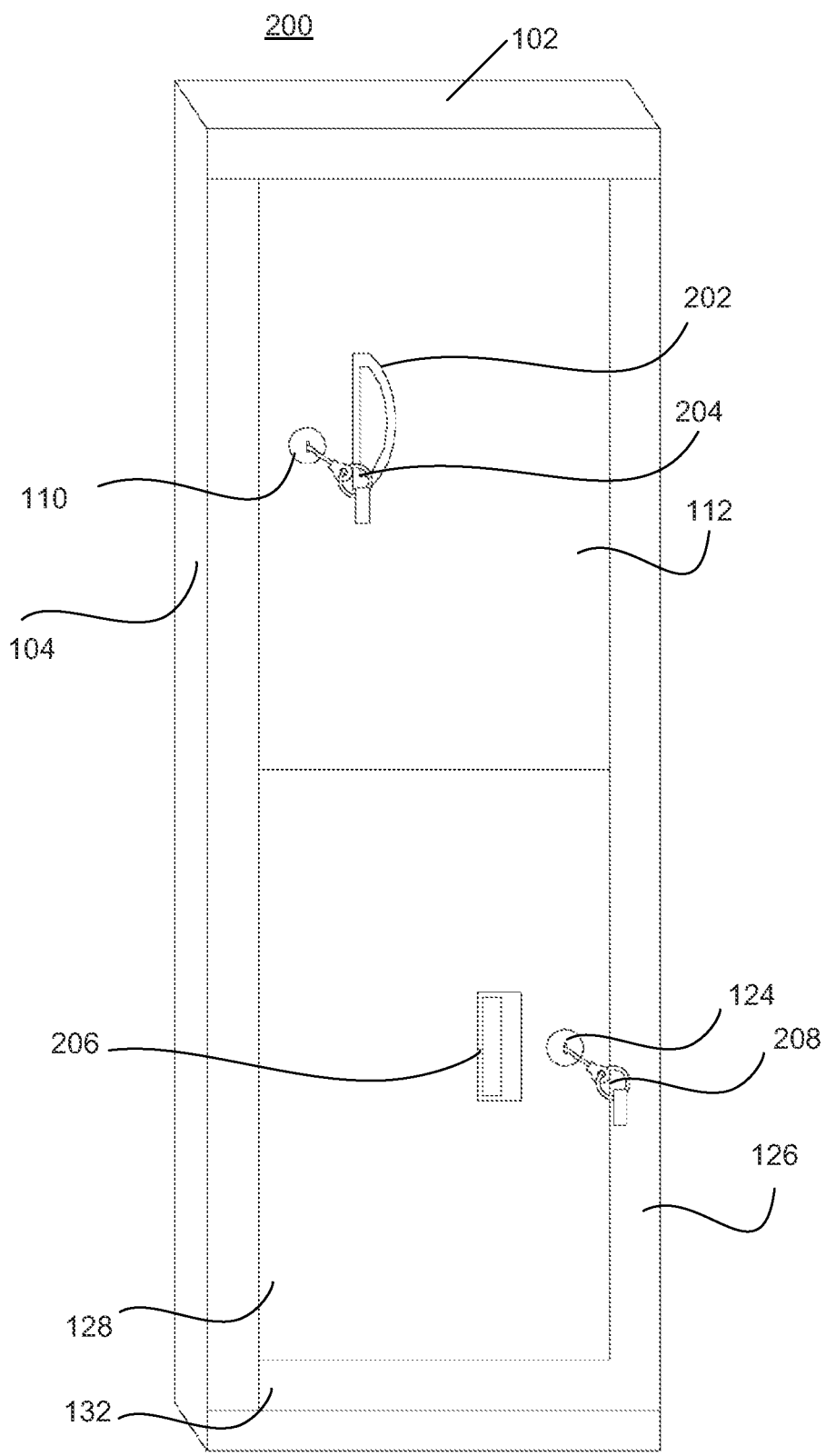
FIG. 2 is another front view of an embodiment of the storage locker of FIG. 1.
Figure 3:
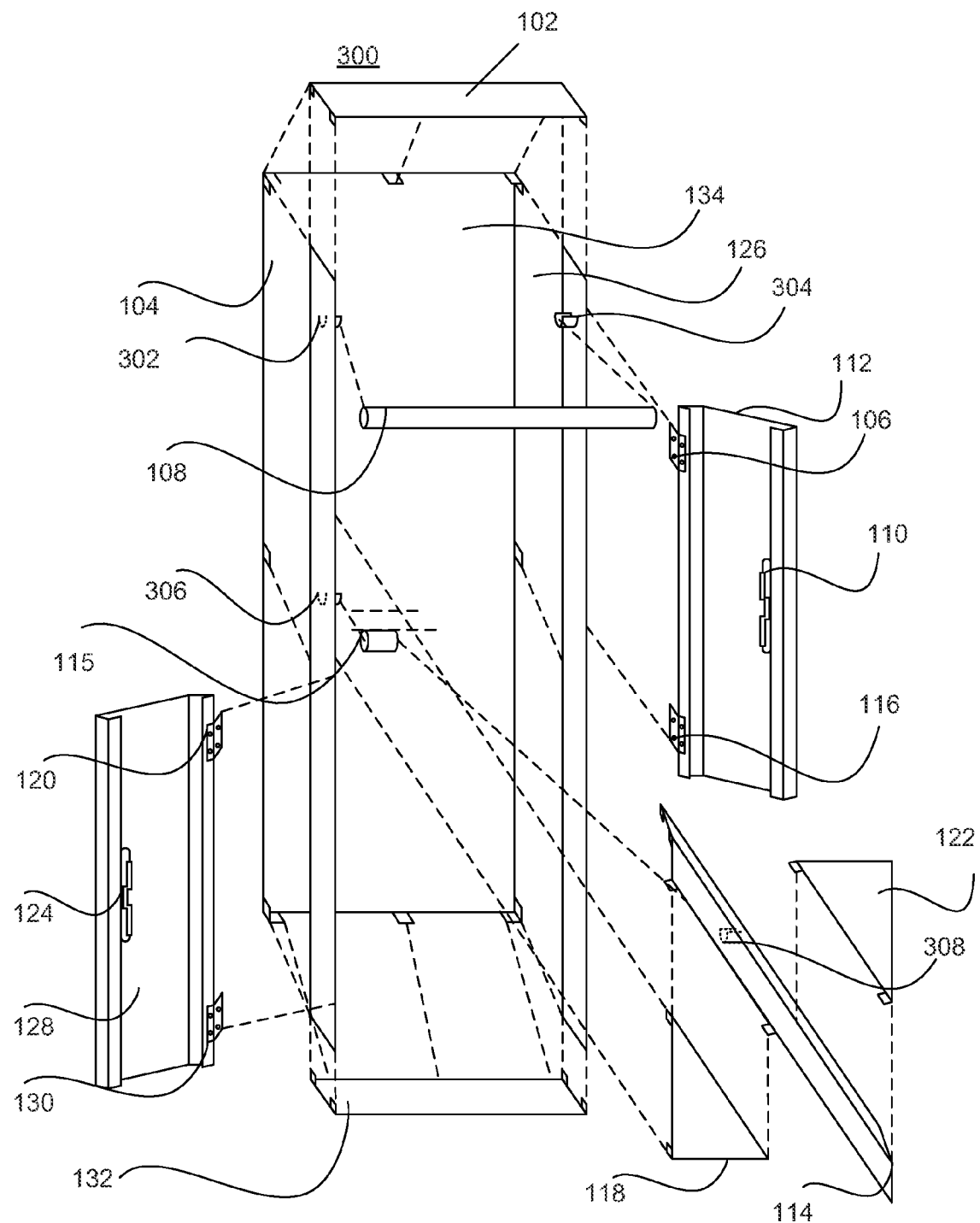
FIG. 3 shows an exploded view of an embodiment of the storage locker of FIG. 1.
Figure 4:
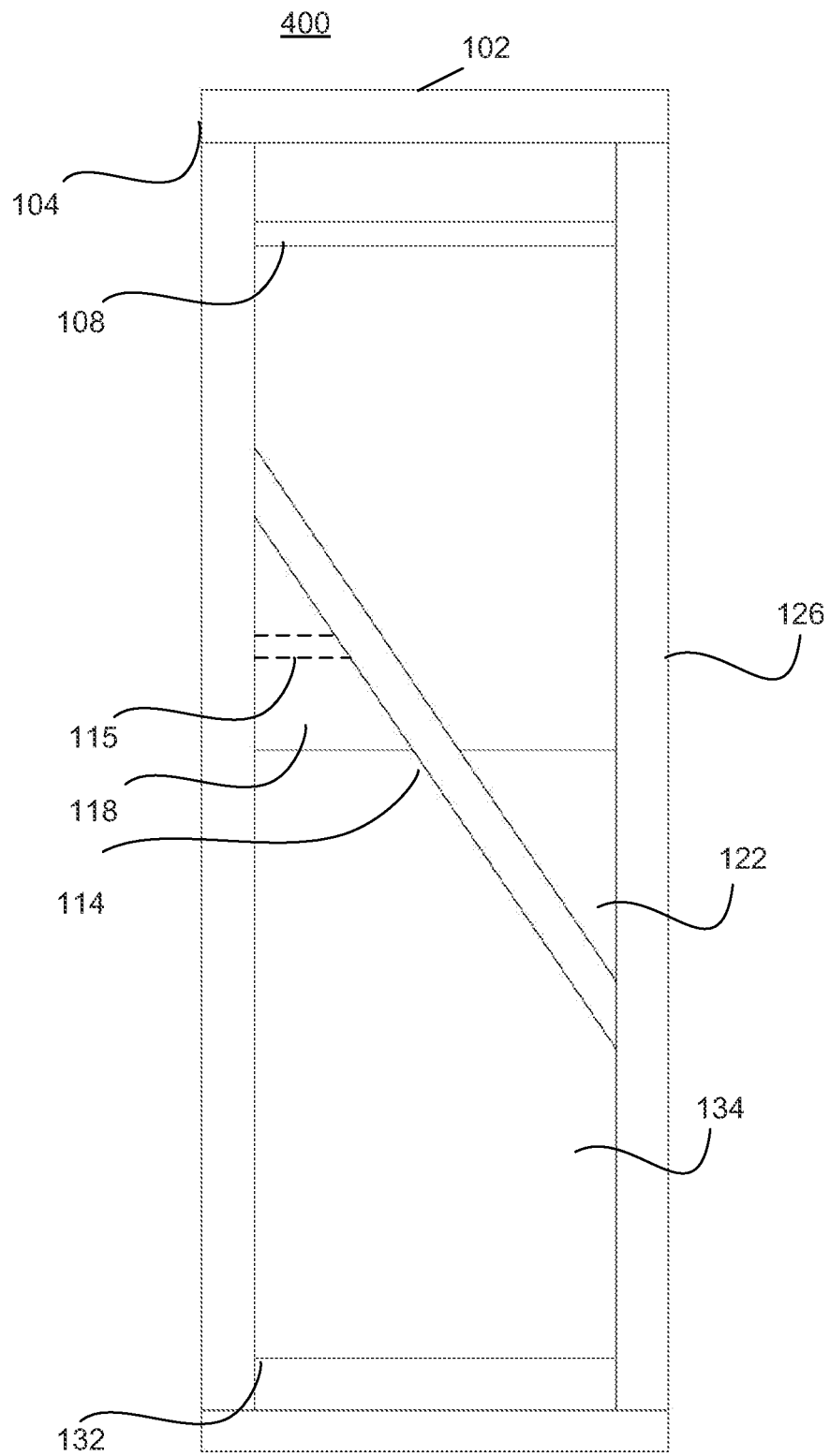
FIG. 4 is a front view of an embodiment of the storage locker of FIG. 1 without the door.
Figure 5:
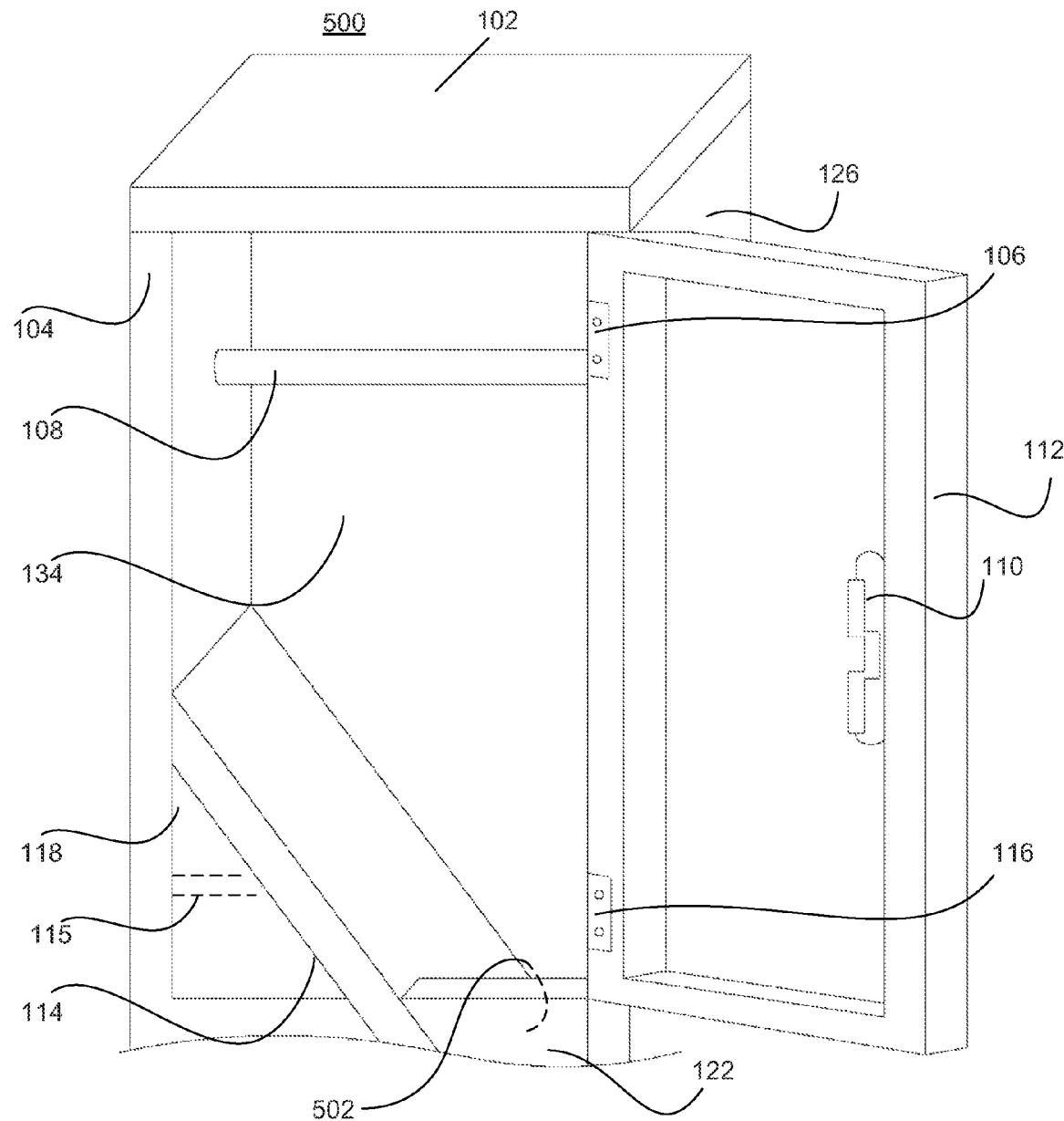
FIG. 5 is a front view of an embodiment of the top storage locker of FIG. 1.
Figure 6:
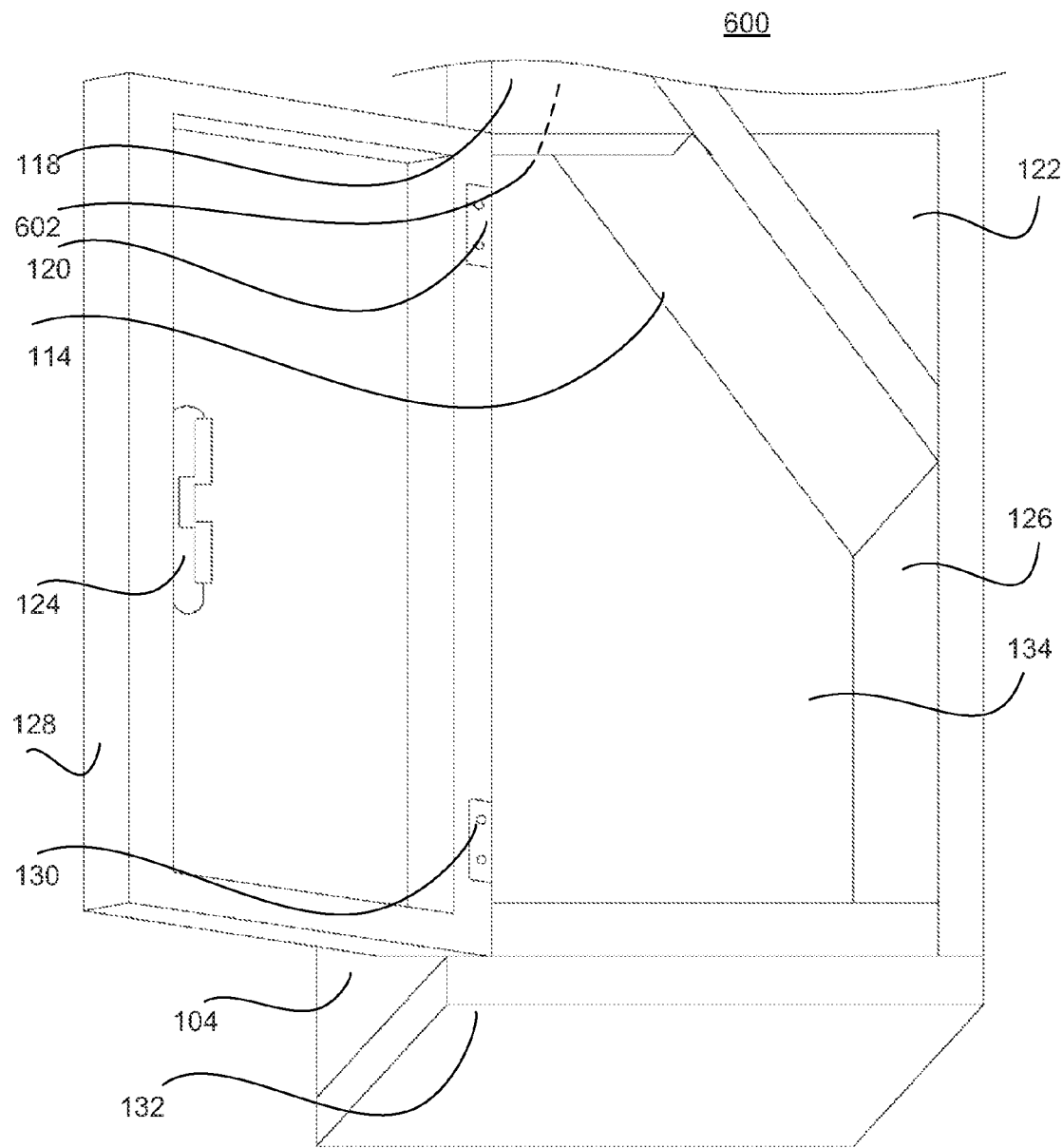
FIG. 6 is a front view of an embodiment of the bottom storage locker.
Figure 7C:
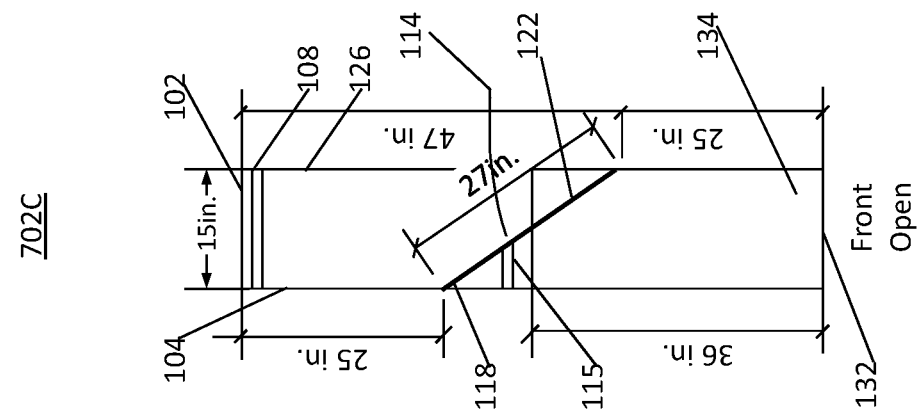
FIGS. 7A-7C show the dimensions of the various parts of an embodiment of the storage locker of FIG. 1.
Figure 7B:
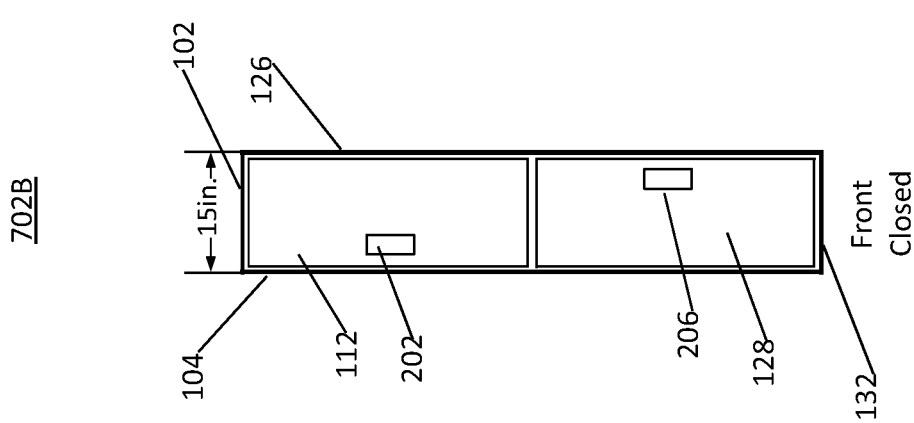
Figure 7A:
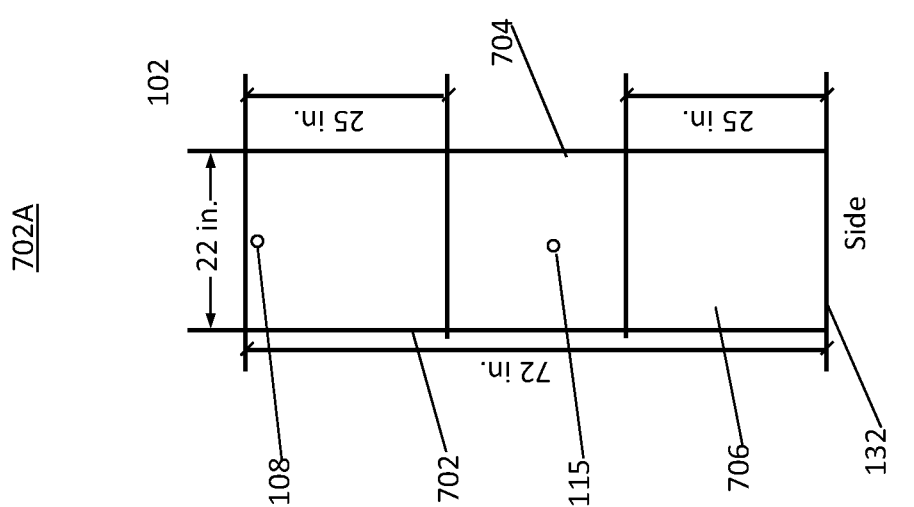

First a brief explanation of how FIGS. 1-6 and 7A-7C relate to one another is presented which is followed by a detailed explanation of FIGS. 1-6 and 7A-7C. FIG. 1 shows the front view of an embodiment of the storage locker with the doors open. FIG. 2 shows the front view of an embodiment of the storage locker with the doors closed. FIG. 3 shows an explored view of the locker. FIG. 4 shows the front view of an embodiment of the storage locker without the doors. FIG. 5 shows the front view of an embodiment of the top storage locker with the doors open and FIG. 6 shows the bottom storage locker with the doors open and FIG. 7A-7C shows the dimensions of the locker in an embodiment.

Any of the systems and methods of this specification may be used in conjunction with any of the systems and methods of U.S. Non-Provisional patent application Ser. No. 12/925,282. For example, any of the lockers of this specification may be used as any of the lockers of U.S. Non-Provisional patent application Ser. No. 12/925,282.

Storage Locker

FIG. 1 shows the front view of locker 100. Locker 100 may include top panel 102, left side panel 104, hinge 106, top hanging rod 108, top lock 110, top locker door 112, angled locker divider 114, bottom hanging rod 115, hinge 116, triangular panel 118, hinge 120, triangular panel 122, bottom lock 124, right side panel 126, bottom locker door 128, hinge 130, bottom panel 132, and back panel 134. In other embodiments, the locker may not have all the components and/or may have other embodiments in addition to or instead of the components listed above.

In an embodiment, locker 100 may be divided into a top locker and a bottom locker. The top and bottom lockers may be operated individually and each of the lockers may have a separate lock. In an embodiment, the top and bottom lockers are operated by different users. Top panel 102 may be the roof of locker 100. Left side panel 104 may be the panel on the left side of locker 100, which may span the height of locker 100. Hinge 106 may be the hinge that may be used to attach the top door to locker 100, and the top door may swing on hinge 106. Top hanging rod 108 may be provided for hanging clothes by a hanger and may run along the width of locker 100. Longer length clothing (such as jackets and coats) may be hung from hanging rod 108, and the clothing may hang down into the well, formed by a triangular panel the slanted bottom divider, the right wall, and back wall. Top lock 110 may be used to lock top locker door 112 of locker 100. Top lock 110 may be such that the key may be removed only when the locker is locked. In another embodiment, top lock 110 and any of the locks mentioned in this specification may include any lock. For example, top lock 110 and any of the locks of this specification may include a key pad for punching in a code that opens the lock, a combination lock, an electronic digital lock, a lock that is opened by a card with a magnetic strip, a lock that is openable remotely, such as via the internet and/or via a telephone. Locks that are openable remotely may include an interface for communicating with a wide area network, local area network and/or a nearby handheld device (such as a mobile phone, tablet computer or laptop). The interface to the handheld device, the local area network, and/or the wide area network may or may not be wireless. Top locker door 112 may be used to close the top locker. Angled locker divider 114 divides the top and bottom lockers. Angled locker divider 114 may be fitted at an angle such that clothes of different lengths may be hanged in the top locker. In the top locker, clothes may be hanged from hanging rod 108. The right side of the top locker may be used to hang longer clothes while the left side of the top locker may be used to hang shorter clothes. In an embodiment, the position of the angled locker divider 114 may vary from being almost vertical to almost horizontal. For example, angled locker divider 114 may form an 89° angle with the bottom panel. In another example angled locker divider 114 may form a 1° angle with the bottom panel. As another example, angled locker divider 114 may lie along the diagonal of locker 100, so that the top locker compartment (accessible only by top locker door 112) has an upside down triangular cross-section, and the bottom locker compartment (accessible only be the bottom locker door) has a right side up triangular cross-section. Bottom hanging rod 115 may be used to hang clothes in the bottom locker and may be shorter in length compared to top hanging rod 108. Since bottom hanging rod 108 is located in the upper part of the bottom locker (which may be covered by a front panel), taller clothing may be hung in the bottom locker than were hanging rod 108 elsewhere. Bottom hanging rod 115 is shown with dashed lines because bottom hanging rode 115 is hidden from view. Bottom hanging rod 115 may be placed in the hollow space between angled locker divider 114 and left side panel 104.

Hinge 116 may be similar to hinge 106. The combination of hinges 106 and 116 support top door 112. Triangular panel 118 covers the space between the angled locker divider 114, the back panel (discussed later) and left side panel 104. Triangular panel 118 prevents the user of the top locker from accessing the portion of the bottom locker that may be covered by triangular panel 118. Triangular panel 118 in combination with angled locker divider 114, the back panel (discussed later) and left side panel 104 forms a hollow space. Bottom hanging rod 115 may be hidden behind triangular panel 118 and hence is shown in dashed lines. The hollow space may be accessible from the bottom locker but not from the top locker. Triangular panel 118 hides bottom hanging rod 115. Hinge 120 may be a hinge that attaches the bottom locker door to the locker and may be similar to hinge 106, discussed above. Triangular panel 122 covers the space between the angled locker divider 114 and the right side panel (discussed later); the space may be hollow and accessible from the top locker. Triangular panel 122 prevents the user of the bottom locker from accessing the portion of the top locker covered by triangular panel 122. Longer length clothing (such as jackets and coats) may be hung from hanging rod 108 and may hang down into the space covered by triangular panel 122. The bottom locker door (discussed later) covers triangular panel 122 and there is no access to the space from the bottom locker. Bottom lock 124 may be a lock for locking the bottom locker. The lock may be the same or similar to top lock 110. Right side panel 126 covers the right side in the locker running the height of the locker. Bottom locker door 128 may be used to cover the bottom locker and the lock fitted on the door may be used to lock the bottom locker. Hinge 120 attaches the bottom locker with bottom locker door 128. Hinge 116, hinge 120 and hinge 130 are hinges similar to hinge 106. Bottom panel 132 covers the bottom of locker 100 forming the floor of the bottom locker. Back panel 134 covers the back side of the locker and may span the height of locker 100.

In an embodiment, top panel 102, left side panel 104, right side panel 120, top locker door 112, bottom locker door 124, bottom panel 132, triangular panel 118, triangular panel 122, angled locker divider 114 and back panel 134 of the locker may be made out of laminated wood. In another embodiment, the locker may be made out of thin sheet metal, plastic, wood, stone, fiberglass, lead, bricks, cement, particle board, or any of a host of other materials.

Top panel 102 appears in FIG. 2, FIG. 3, FIG. 4, FIG. 5 and FIGS. 7A-7C. Since the description of top panel 102 was discussed above, that description will not be repeated in FIG. 2, FIG. 3, FIG. 4, FIG. 5 and FIGS. 7A-7C. Left side panel 104 and right side panel 126 were discussed above, and therefore although left side panel 104 and right side panel 126 appear in FIG. 2, FIG. 3, FIG. 4, FIG. 5, FIG. 6 and FIGS. 7A-7C, the discussion will not be repeated in the discussion of FIG. 2, FIG. 3, FIG. 4, FIG. 5, FIG. 6 and FIGS. 7A-7C. Hinge 106 and hinge 116 appear in FIG. 3 and FIG. 5, since the description of hinge 106 and hinge 116 was discussed above, that description will not be repeated in the discussion of FIG. 3 and FIG. 5. Top hanging rod 108 and bottom hanging rod 115 were discussed above, and therefore although top hanging rod 108 and bottom hanging rod 115 appear in FIG. 3, FIG. 4, FIG. 5 and FIG. 7A-7C, the description will not be repeated in FIG. 3, FIG. 4, FIG. 5 and FIG. 7A-7C. Similarly, top lock 110 is discussed above and therefore although top lock 110 appears in FIG. 2, FIG. 3 and FIG. 5, the description of top lock 110 will not be repeated in FIG. 2, FIG. 3 and FIG. 5. Top locker door 112 is discussed above and therefore although top locker door 112 appears in FIG. 2, FIG. 3, FIG. 5 and FIG. 7A-7C, the description of top locker door 112 will not appear in FIG. 2, FIG. 3, FIG. 5 and FIGS. 7A-7C. Angled locker divider 114, triangular panel 118, triangular panel 122 and back panel 134 discussed above appear in FIG. 3, FIG. 4, FIG. 5, FIG. 6 and FIGS. 7A-7C and consequently the description of angled locker divider 114, triangular panel 118, triangular panel 122 and back panel 134 will not appear in FIG. 3, FIG. 4, FIG. 5, FIG. 6 and FIGS. 7A-7C. Hinge 120 and hinge 130 were described above in FIG. 3 and FIG. 6. That description will not be repeated in FIG. 3 and FIG. 6. Bottom lock 124 discussed above appears in FIG. 2, FIG. 3 and FIG. 6 and consequently the description of bottom lock 124 will not appear in FIG. 2, FIG. 3 and FIG. 6. Bottom locker door 128 was discussed above in FIG. 2, FIG. 3 and FIG. 6 and FIGS. 7A-7C and consequently the description of bottom locker door 128 will not appear in FIG. 2, FIG. 3, FIG. 6 and FIG. 7A-7C. Bottom panel 132 discussed above, appear in FIG. 2, FIG. 3, FIG. 4, FIG. 6 and FIGS. 7A-7C and consequently the description of bottom panel 132 will not appear in FIG. 2, FIG. 3, FIG. 4, FIG. 6 and FIGS. 7A-7C.

FIG. 2 shows the front view 200 of the locker with doors closed in an embodiment. The locker includes top panel 102, left side panel 104, top lock 110, top locker door 112, bottom lock 124, right side panel 126, top handle 202, top key 204, bottom handle 206, bottom key 208, bottom locker door 128 and bottom panel 132. In other embodiments, the locker may not have all the components and/or may have other embodiments in addition to or instead of the components listed above.

In an embodiment, top handle 202 may be a handle attached to top locker door 112 that aids in opening the top locker. Top key 204 may facilitate locking or unlocking the top locker. Bottom handle 206 may be a handle fitted to bottom locker door 128 which aids in opening the bottom locker. Bottom key 208 may facilitate locking and unlocking the bottom locker.

In an embodiment, top key 204 may only be removed from top lock 110 (FIG. 1) when top lock 110 is in the locked configuration. When in the unlocked configuration, top key 204 cannot be removed from top lock 110 without breaking top lock 110, and may be stored there until the next user makes use of the top locker. When a user arrives at a locker, top key 204 may be in top lock 110. After placing the laundry in the top locker and locking top lock 110, the user removes top key 204 from top lock 110, and is free to take top key 204 to any location the user pleases, such as home. A laundry service retrieves the clothing, cleans the clothing, and returns the clothing to the locker. Upon picking up cleaned laundry, top key 204 may be inserted into top lock 110 to unlock top lock 110. The user retrieves the laundry (which was cleaned by a laundry service in the interim), and leaves top key 204 stored in top lock 110 for the next user that would like to user the locker. The operation of the bottom locker may be similar to the operation of the top locker.

In another embodiment, top key 204 and bottom key 208 may be any key that is appropriate for the lock chosen (which may be any lock as discussed in conjunction with top lock 110). For example, top key 204 may be replaced with a digital lock having a master combination and a user combination to operate the locker. The master combination may be used by the service provider to operate the locker to collect articles for service or return the serviced articles to the lockers. The user combination may be used by a user while dropping articles for service or collecting serviced articles. In an embodiment, the user combination may be used once. In an embodiment, the locker used by the user while requesting service may not be the same locker used to pick up articles after service, and the user may be given one locker combination for dropping off the articles and another locker combination for picking up the articles, which may be for the same or a different locker. The service provider may change the user lock combination prior to the user dropping off the articles, after the user drops off the articles, prior to the service provider picks up the articles, after the service provider picks up the articles, prior to the service provider drops off of the articles, after returning the clothing to a locker, prior to the user picks up the article, and/or after the user picks up the articles.

FIG. 3 shows the relationship and order of assembly of various parts of the locker in an embodiment in which the locker may be made from metal. The locker includes top panel 102, left side panel 104, hinge 106, top hanging rod 108, top lock 110, top locker door 112, angled locker divider 114, bottom hanging rod 115, hinge 116, triangular panel 118, hinge 120, triangular panel 122, bottom lock 124, right side panel 126, bottom locker door 128, hinge 130, bottom panel 132, back panel 134, top rod holder1 302, top rod holder2 304, bottom rod holder1 306 and bottom rod holder2 308. In other embodiments, the locker may not have all the components and/or may have other embodiments in addition to or instead of the components listed above.

FIG. 3 shows the explored view of the locker and the assembly of various parts. In an embodiment, the locker may be made of sheet metal. Various parts of the locker can be assembled with metal flaps. Top rod holder1 302 may be attached (e.g., welded) to the left side panel 104, and top rod holder2 304 may be attached (e.g., welded) to the right side panel 126. Top hanging rod 108 may be held in place by top rod holder1 302 and top rod holder1 304. Bottom rod holder1 306 may be attached (e.g., welded) to the left side panel 104, and bottom rod holder2 308 may be attached (e.g., welded) to angled locker divider 114. Bottom hanging rod 115 may be held in place by bottom rod holder1 306 and bottom rod holder1 308. In other embodiments, the locker may be made from other material, such as wood, particle board, heavy plastic, or a laminate.

FIG. 4 shows the front view 400 of an embodiment of the locker without the doors. In an embodiment, the locker includes top panel 102, left side panel 104, top hanging rod 108, angled locker divider 114, bottom hanging rod 115, triangular panel 118, triangular panel 122, right side panel 126, and bottom panel 132. In other embodiments, the locker may not have all the components and/or may have other embodiments in addition to or instead of the components listed above.

FIG. 4 shows the position of bottom hanging rod 115 which may be hidden behind triangular panel 118.

FIG. 5 shows the front view 500 of the top locker and the hollow space in an embodiment. The top locker includes a top panel 102, left side panel 104, hinge 106, top hanging rod 108, top lock 110, top locker door 112, angled locker divider 114, bottom hanging rod 115, hinge 116, triangular panel 118, triangular panel 122, right side panel 126, back panel 134 and hollow space 502. In other embodiments, the locker may not have all the components and/or may have other embodiments in addition to or instead of the components listed above.

FIG. 5 shows hollow space 502 in the top locker formed by angled locker divider 114, triangular panel 122 and back panel 134. Hollow space 502 may accommodate the bottom portion of some of the clothing hanging from top hanging rod 108, and thereby extends the height of a portion of the locker thereby utilizing the space efficiently.

FIG. 6 shows the front view 600 of the bottom locker and the hollow space in the bottom locker which may not be visible in other views. The bottom locker includes left side panel 104, angled locker divider 114, triangular panel 118, hinge 120, triangular panel 122, bottom lock 124, right side panel 126, bottom locker door 128, hinge 130, bottom panel 132, back panel 134 and hollow space 602. In other embodiments, the locker may not have all the components and/or may have other embodiments in addition to or instead of the components listed above.

FIG. 6 shows hollow space 602 in the bottom locker formed by triangular panel 118, angled locker divider 114 and left side panel 104. Hollow space 602 extends the height of a portion of the locker there by utilizing the space efficiently allowing clothing that is longer clothing to be hung in the bottom locker than were angled locker divider replaced with a horizontal locker divider. Bottom hanging rod 115 may be placed horizontally in hollow space 602 to hang clothes from a hanger.

FIGS. 7A-7C also shows the dimensions of the various parts of the locker and the placement of the angled locker divider. FIG. 7A shows the side view 700A of locker 100. In an embodiment, FIG. 7A the locker in the side view includes top panel 102, top hanging rod 108, bottom hanging rod 115, bottom panel 132, panel 702, panel 704 and side panel 706. Panel 702 and panel 704 may be the front and back panels, respectively, and side panel 706 may be the right side panel. In another embodiment, panel 702 may be the back panel; side panel 706 may be the left side panel. In other embodiments, the locker may not have all the components and/or may have other embodiments in addition to or instead of the components listed above.

In FIG. 7A, in an embodiment, the dimensions of the locker are 22" in depth, and 72" in height. Angled locker divider 114 may be placed such that the top edge of angled locker divider 114 may be 25" from top panel 102 and the bottom edge of angled locker divider 114 may be 25" from bottom panel 132. In an embodiment, side panel 706 may be 22" in width and 72" in height.

FIG. 7B shows the front view 700B with the door closed. In an embodiment, in FIG. 7B the locker 100 in front view 700B with the closed doors include top panel 102, left side panel 104, top locker door 112, right side panel 126, bottom locker door 128, bottom panel 132, top door handle 202 and bottom door bottom handle 206. In other embodiments, the locker may not have all the components and/or may have other embodiments in addition to or instead of the components listed above.

In FIG. 7B, in an embodiment, shows the front view with doors closed shows the dimensions of locker to be 15" in width, in the front view without the doors.

FIG. 7C shows the front view 700C without the door of locker 700C. In an embodiment, in FIG. 7C locker 100 in front view 700C without doors include top panel 102, left side panel 104, top hanging rod 108, angled locker divider 114, bottom hanging rod 115, triangular panel 118, triangular panel 122, right side panel 126, bottom panel 132 and back panel 134. In other embodiments, the locker may not have all the components and/or may have other embodiments in addition to or instead of the components listed above.

FIG. 7C in an embodiment, shows front view 700C without the doors and angled locker divider 114 to be 27" in length and placed such that it is 25" from the bottom surface of bottom panel 132 and 47" from the top surface of top panel 102. Triangular panel 118 covers a portion of the bottom locker and is placed between 25" from the top surface of top panel 102 and 36" from bottom surface of bottom panel 132. Triangular panel 122 covers a portion of the top locker and is placed between 25" from bottom surface of bottom panel 132 and 36" from the top surface of top panel 102.

In an alternative embodiment, angled locker divider 114 may be 27" in length and placed such that it is 25" from the top surface of bottom panel 132 and 47" from the bottom surface of top panel 102. Triangular panel 118 covers a portion of the bottom locker and is placed between 25" from the bottom surface of top panel 102 and 36" from the top surface of bottom panel 132. Triangular panel 122 covers a portion of the top locker and is placed between 25" from the top surface of bottom panel 132 and 36" from the bottom surface of top panel 102.

Figure 8:
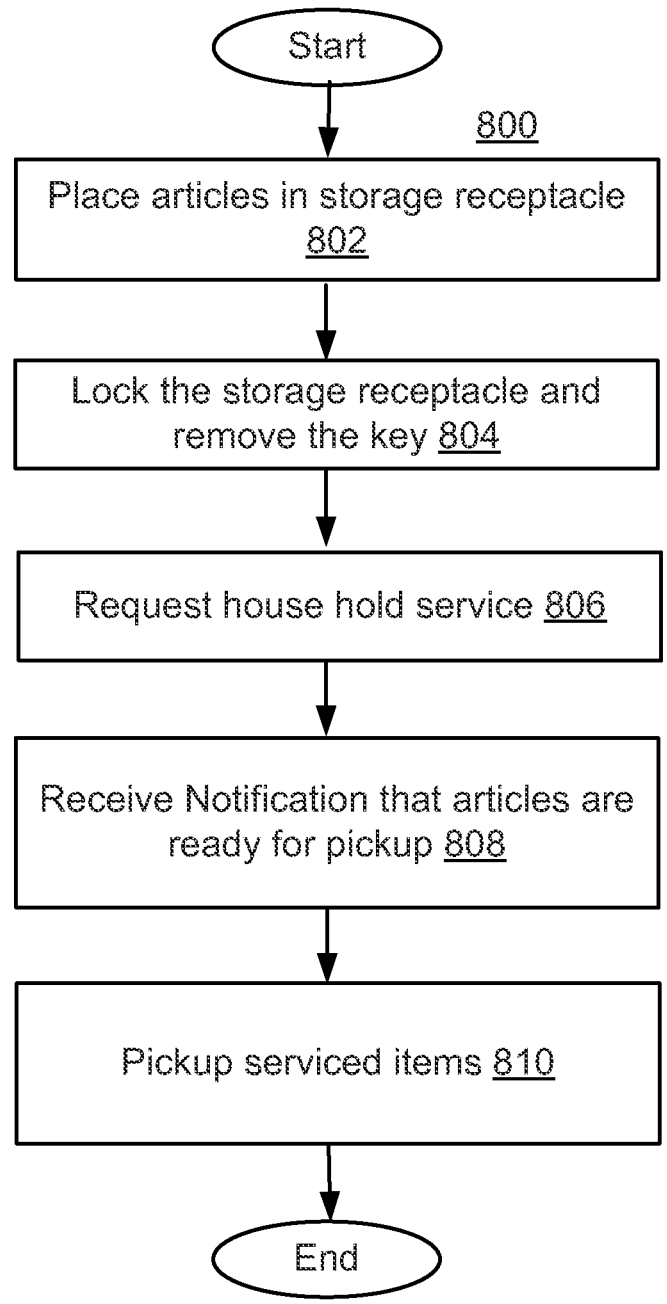
FIG. 8 shows a flowchart of an embodiment of a method for using the services provided by the household services company.

FIG. 8 shows a flowchart of an embodiment of method 800 of using locker 100 that may be performed by a user. Users interact with household services such as a laundry service in a variety of ways. In an embodiment, the users may deposit their articles for which service may be desired in a storage receptacle. In an embodiment, the articles for which service is desired may be any of a number of different types of articles needing any of a number of different services. In an embodiment, locker 100 may be a storage receptacle used in house hold services companies. The lockers of this specification may be used for household services. In an embodiment, the storage locker may be used by a company providing laundry service. In this specification the storage receptacle referred to in conjunction with FIG. 8 and FIG. 9 may be a storage locker such as in FIG. 1. In step 802, the user places the articles for service in the storage receptacle, the storage receptacle can be locker 100. In an embodiment, the articles can be clothes. The user can hang clothes from the hanging rod 108 in the top locker. In an embodiment, the angled locker divider 114 divides the locker such that the left side of the top locker is shorter than the right side. A well or a hollow space 502 is formed on the right side so that longer articles can be hung on the right side of the top locker, while shorter clothes can be hung on the left side. If the bottom locker is used, the user can hang clothes on the hanging bar and/or place clothes at the bottom of the bottom locker. The angled locker divider 114 provides a shorter hanging rod in the bottom locker compared to top locker. The user may choose a top locker if long clothes need to be hung or more clothes need to be hung. The bottom locker maybe chosen if there are articles that need to be placed flat or few clothes need to hung. In step 804 the user locks the storage receptacle and takes the key. The lock of the storage receptacle may be such that the key needs to be placed in the keyhole when the door in not locked and the receptacle needs to be locked in order to remove the key. In an embodiment, the user keeps the key until the articles are returned to the storage receptacle, and the storage receptacle is not used by other users prior to the articles of the current user being picked up from the storage receptacle. In alternative embodiments, the lock requires a code or combination in order to be opened, that allows the household services company to change the code or combination for use by other users after the articles are picked up. In step 806, the user may send a request to the household services company indicating that the articles are placed in the storage receptacle for service along with instructions for service. In step 808, the user receives a notification that the articles are ready for pickup. In step 810, the user returns the key to the storage receptacle in order to unlock and pick up the serviced items. In an embodiment, if the lock requires a code or combination in order to be opened, the user may be supplied with a new code for opening the storage area (which may be expected to be accessible exclusively by that user). As part of step 810, after retrieving the articles, the user leaves the locker with the key stored in the lock of the locker.

In an embodiment, each of the steps of method 800 is a distinct step. In another embodiment, although depicted as distinct steps in FIG. 8, steps 802-810 may not be distinct from one another. In other embodiments, method 800 may not have all of the above steps and/or may have other steps in addition to or instead of those listed above. Although in one embodiment the steps of method 800 are preformed in the order listed above, in other embodiments the steps of method 800 may be performed in another order, and only some of, or possibly none of, the steps of method 800 are performed in the order listed above.

Figure 9:
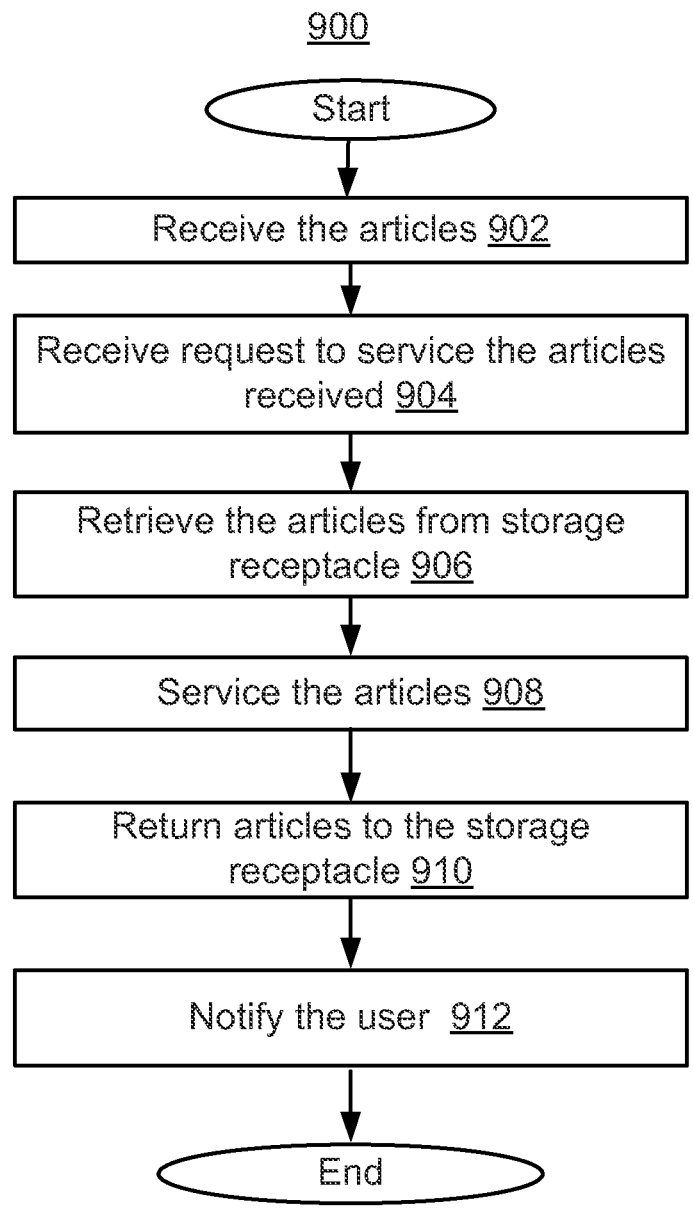
FIG. 9 shows a flowchart of an embodiment of a method performed by the household services company.

FIG. 9 shows a flowchart of an embodiment of method 900 that may be performed by the household services company. In step 902, the articles that need to be serviced are received in a storage locker (discussed in conjunction with FIG. 1.) In step 904, the household services company receives a request to service articles (e.g., clean a batch of clothing). Step 904 may include receiving instructions for how to service the articles, or user service instructions may be received at a later step. Step 904 may include receiving information about a feature requiring special attention, such as a stain, tear, or scratch. In an alternative embodiment, a combination or code may be received by the household services company for opening the storage receptacle containing the articles. Step 904 may also include receiving a payment. In step 906, the household services company retrieves the articles. Optionally, the user service instructions are never received. In step 908, the articles are serviced, and if service instructions are received the articles are serviced according to the instructions. In step 910, the serviced articles may be placed in one of the storage receptacles that the user reserved by taking the key. In step 912, the user may be notified that the serviced articles are ready for pickup. In an embodiment, if the lock requires a code or combination in order to be opened, the user may be supplied with a new code for opening the storage receptacle.

In an embodiment, each of the steps of method 900 is a distinct step. In another embodiment, although depicted as distinct steps in FIG. 9, steps 902-912 may not be distinct from one another. In other embodiments, method 900 may not have all of the above steps and/or may have other steps in addition to, or instead of, those listed above. Although in one embodiment the steps of method 900 are preformed in the order listed above in other embodiments, the steps of method 900 may be performed in another order and only some of possibly none of the steps of method 900 are preformed in the order listed above.

Figure 10:
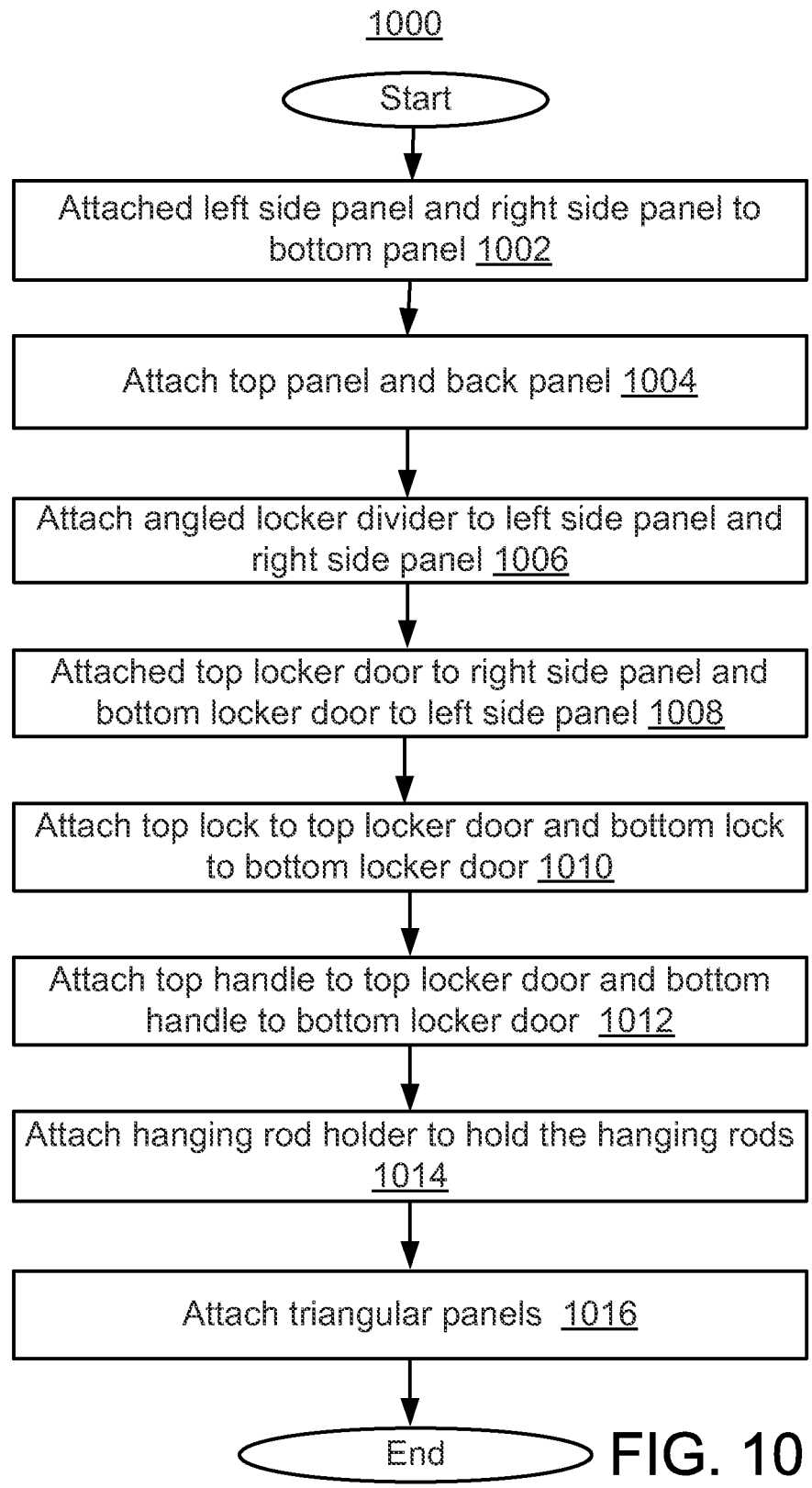
FIG. 10 shows a flowchart of an embodiment of making the storage locker.

FIG. 10 shows a flowchart of an embodiment of method 1000 used in making the storage locker. In step 1002, top panel 134, bottom panel 132, side panels 104 and 126, back panel, doors and hinges are assembled. Optionally, left side panel 104, right side panel 126 and/or back panel 304 may have angled grooves, slots, and/or flanges for supporting the slanted divider between the top and bottom compartments. In step 1002, bottom panel 132 may be attached to left side panel 104 and right side panel 126. Optionally, back panel 134 may also be attached to top panel 102, left side panel 104, and right side panel 126.

Throughout method 1000, whenever two panels are attached together, the manner in which the panels are attached may include screwing the panels together, nailing the panels together, gluing the panels together, and/or drilling holes in a first panel, inserting one end of the pegs into the holes, drilling holes for the pegs in a second panel at the points where the pegs from the first panel meet the second panel when the two panels are joined in the manner in which they will be attached, and inserting the other end of pegs from the first panel in the holes of the second panel. In an embodiment in which the panels are metallic, the panels may be attached by welding the panels together, such as be welding tabs or changes on one panel to another panel and/or to tabs and/or flanges of another panel at the point where the panels are attached. If the panels are made from plastic or a laminate, the panels may be heat bonded (by heating the panels at the point where the panels touch, thereby melting the plastic in the region where the panels are joined, and then allowing the melted surfaces to cool while in contact to form a bond).

In step 104, top panel 102 is attached to left side panel 104 and right side panel 126. If back panel 134 was already attached in step 1002, then in step 104 top panel 104 may also be attached to back panel 134. If back panel 134 was not attached in steps 1002, then in step 104 back panel 134 may also be attached to top panel 102, left side panel 104, right side panel 126, and bottom panel 132. In an alternative embodiment, top panel 104 is attached to side left panels 104, right side panel 126, and back panel 134 and then bottom panel 134 is attached, or alternatively first side left panels 104 and right side panel 126 are attached to the back panel 134 and then the top panel 102 and bottom panel 132 are attached.

In step 1006, angled locker divider 114 is attached to left side panel 104, the right side panel 126 and optionally back panel 134. Attaching locker divider 114 to the left panel 104, right panel 126, and/or back panel 134 may involve sliding locker divider 114 into grooves and/or slots, which may be formed by flanges or molded or carved into left side panel 104, right side panel 126, and/or back panel 134.

In step 1008, top locker door 112 is attached using hinge 106 and hinge 116 to right side panel 12 to form top locker and bottom locker door 128 is attached using hinge 120 and hinge 130 to left side panel 104 to form bottom locker.

In step 1010, top lock 110 is attached to top locker door 112 and bottom lock 124 is attached to bottom locker door using screws or glue or any other attaching means.

In step 1012, top handle 202 is attached to top locker door 112 and bottom handle 206 is attached to bottom locker door 128.

In step 1014, top rod holder1 302 is attached to left side panel 104 and top rod holder2 304 is attached to right side panel 126 to hold top hanging rod 308. Bottom rod holder1 306 is attached to left side panel 104 and bottom rod holder2 308 is attached to angled locker divider 114 to hold bottom hanging rod 315. Optionally, instead of or in addition to top rod holder1 302, top rod holder2 304, bottom rod holder1 308, and/or bottom rod holder2 315 a socket, well, or hole may be formed in left side panels 104, right side panel 126, and/or angled locker divider 114 for holding top hanging rod 308 and bottom hanging rod 315 in place.

In step 1016, triangular panel 118 is attached to left side panel 104 and angled locker divider 114 to cover a portion of the bottom locker such that the bottom locker the user of top locker cannot access the bottom locker. Similarly, triangular panel 122 is attached to right side panel 126 and angled locker divider 114 to cover a portion of the top locker so that the bottom locker user cannot access the top locker.

In an embodiment, each of the steps of method 1000 is a distinct step. In another embodiment, although depicted as distinct steps in FIG. 10, steps 1002-1016 may not be distinct from one another. In other embodiments, method 1000 may not have all of the above steps and/or may have other steps in addition to, or instead of, those listed above. Although in one embodiment the steps of method 1000 are preformed in the order listed above in other embodiments, the steps of method 1000 may be performed in another order and only some of possibly none of the steps of method 1000 are preformed in the order listed above.

Extensions and Alternatives

In another embodiment a foldable shelf half the width of the locker can be implemented so that some clothes may be placed on the shelf while others can be hanged.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:
1. A locker system comprising:
  a top compartment formed by at least
    sidewalls, and
    a floor, the floor being slanted with respect to the sidewalls; and
  a bottom compartment that is located below the top compartment formed by at least the
    sidewalls, and
    a ceiling, the ceiling being slanted, the ceiling of the bottom compartment being formed from the floor of the top compartment;
  a top door for opening and closing the top compartment;
  a bottom door for opening and closing the bottom compartment; and a front panel covering at least a portion of the bottom compartment that extends to an upper half of the locker system, the front panel being located just behind the top door when the top door is in a closed position; the front panel thus restricts access to the bottom locker, from the upper half of the locker system, when the top door is in an open position.

2. The locker system of claim 1 where the top door is attached to the top compartment by a top set of hinges and the bottom door is attached to the bottom compartment by a bottom set of hinges.

3. The locker system for claim 2 where the top set of hinges are attached to a first side of the locker system to open in a first direction and the bottom set of hinges are attached to a second side of the locker system to open in a second direction.

4. The locker system of claim 1, the top door of the top compartment has a first lock system for locking the top compartment and the bottom door of the bottom compartment has a second lock system for locking the bottom compartment.

5. The locker system of claim 1, further comprising:
a top lock on the top door and a top key for the top lock, the top lock being configured, such that the top key is held in the lock and prevented from being removed when the lock is unlocked and the top key can be removed when the lock is locked; and
a bottom lock on the bottom door and a bottom key for the bottom lock, the bottom lock being configured, such that the bottom key is held in the bottom lock and prevented from being removed when the bottom lock is unlocked and the bottom key can be removed when the bottom lock is locked.

6. The locker system of claim 1, further comprising:
a top digital lock on the top door having a first wireless interface for wirelessly communicating with a remotely located device for entering a first code, the top digital lock being configured to unlock when the first code is wirelessly entered, via the first wireless interface, as a wireless communication from the remotely located device, and to lock in response to another wireless communication from the remotely located device; and
a bottom digital lock on the bottom door having a second wireless interface for wirelessly communicating with the remotely located device for entering a second code, the bottom lock being configured to unlock when the second code is wirelessly entered via the second interface, as a wireless communication from the remotely located device, and to lock in response to another wireless communication from the remotely located device.

7. The locker system of claim 1, further comprising:
a top digital lock on the top door having a first input for entering a first code, the top digital lock being configured to unlock when the first code is entered into the first input; and
a bottom digital lock on the bottom door having a second input for entering a second code, the bottom digital lock being configured to unlock when the second code is entered into the second input.

8. The locker system of claim 1, further comprising:
a hang bar for hanging clothing in the top compartment, mounted on the sidewalls of the top compartment.

9. The locker system of claim 1, as a result of the floor of the top compartment being slanted, the floor of the top compartment has a high edge and a low edge that is lower than the high edge;
at the high edge of the floor, the floor meets a first side of the top compartment and at the low edge of the floor, the floor meets a second side of the top compartment; and
a vertical length along the second side of the top compartment is longer than a vertical length along the first side of the top compartment.

10. The locker system of claim 1, the floor of the top compartment creates a well on one side of the top compartment within which bottoms of long clothing hanging in the top compartment hang into.

11. The locker system of claim 1, the floor having a higher edge and a lower edge that is lower than the higher edge,
one edge of the panel is attached to the lower edge of the floor of the top compartment and a second edge of the panel is attached to a first of the two sidewalls of the top compartment of the locker, and
the first sidewall, a back wall, the floor, and the panel forming a well.

12. The locker system of claim 1, the ceiling having a higher edge and a lower edge that is lower than the higher edge,
one edge of the front panel is attached to the higher edge of the ceiling of the bottom compartment and another edge of the front panel is attached to a first of the two sidewalls of the bottom compartment of the locker, and
the first of the two sidewalls, a back wall, the ceiling, and the front panel forming a cavity at the top of the bottom locker.

13. The locker system of claim 1, as a result of the ceiling of the bottom compartment being slanted, the ceiling of the bottom compartment has a high edge and a low edge that is lower than the high edge,
at the high edge of the ceiling, the ceiling meets a first side of the bottom compartment and at the low edge of the ceiling, the ceiling meets a second side of the bottom compartment; and
a vertical length along the first side of the bottom compartment is longer than a vertical length along the second side of the bottom compartment.

14. The locker system of claim 1, further comprising:
a hang bar for hanging clothing in the bottom compartment, behind the front panel, mounted on
the sidewall of a first side of the bottom compartment and
the slanted ceiling of the bottom compartment.

15. The locker system of claim 1, where the locker system is made of sheet metal.

16. The locker system of claim 1, where the locker system is made of particle board.

17. The locker system of claim 1, where the locker system is made of hard plastic laminate.

18. The locker system of claim 1, wherein
the locker system has a height of 72", a width of 15", and a depth of 22";
the floor of the top compartment being 27" in length;
the locker system has a top and a bottom;
one end of the slanted floor is placed 25" from the top of the locker system,
and
another end of the slanted floor is 25" from the bottom of the locker system.

19. The locker system of claim 1,
the top door is attached to the top compartment by a top set of hinges and the bottom door is attached to the bottom compartment by a bottom set of hinges;
the top door of the locker has a top lock system for locking the top compartment and the bottom door of the locker has a bottom lock system for locking the bottom compartment;

the locker system also including at least a top hang bar for hanging clothing in the top compartment, mounted on a portion of the sidewalls in the top compartment;

as a result of the floor of the top compartment being slanted, a first side of the top compartment is longer than a second side of the top compartment and creates a well on the first side of the top compartment to into which hanging clothing hang into when the hanging clothing is long enough;

as a result of the ceiling of the bottom compartment being slanted, a first side of the bottom compartment is longer than a second side of the bottom compartment, and the second side of the bottom compartment is on the same side of the locker system as the first side of the top compartment;

the side walls of the top compartment, the sidewalls of the bottom compartment, the ceiling of the top compartment, a back wall of the locker system and a floor of the bottom compartment are permanently attached together;

the front panel that covers at least the portion of the top compartment being a first front panel;

the first front panel extends to a lower half of the locker system, the first front panel being located just behind the bottom door, when the bottom door is in a closed position; the first front panel thus restricts access to the top locker, from the lower half of the locker system when the bottom door is in an open position, a second front panel covering at least a portion of the bottom compartment that extends to an upper half of the locker system, the second front panel being located just behind the top door, when the top door is in a closed position; the second front panel thus restricts access to the bottom locker from the upper half of the locker system when the top door is in an open position; and the locker system also including at least a bottom hang bar for hanging clothing in the bottom compartment, behind the other front panel, mounted on the first side of the bottom compartment and the slanted ceiling of the bottom compartment into which hanging clothing hang into when the clothing is long enough.

20. A method of providing household services by a company comprising:

receiving an article for service in a storage locker, wherein the storage locker has
 a top locker with a top door, top roof, a back wall and
 a bottom locker with a bottom door, bottom ceiling, and the back wall;
the top locker further including
 two sidewalls and a slanted bottom and
the bottom locker further including
 two sidewalls and a slanted ceiling,
the top locker having a front panel covering at least a portion of the top compartment that extends to a lower half of the locker system, the front panel of the top locker being located just behind the bottom door, when the bottom door is in a closed position; the front panel of the top locker restricts access to the top locker from the lower half of the locker system when the bottom door is in an open position;
the top locker having a well at the bottom of the top locker formed by the slanted bottom, the front panel of the top locker, and one of two sidewalls of the top locker;
the bottom door covering a portion of the well in the top locker that is hidden by the front panel of the top locker, wherein, the cavity of the top locker is not accessible from the bottom locker as a result of the front panel of the top locker;
the receiving of an article in the storage locker including at least receiving the article in the top locker, such that the article is at least partially within the cavity in the top locker;
receiving by the company, a request for servicing of the article;
picking up the article for service from the storage locker by the company and performing the requested service, and
after performing the requested service, placing the article in a top storage locker for pickup.

21. The method of claim 20, wherein the top door covers a portion of a cavity in the bottom locker that is hidden by the front panel of the bottom locker,
wherein the cavity in the bottom locker is not accessible from the top locker as a result of the front panel of the bottom locker,
the method further comprising:
 receiving another article for service in the bottom locker, positioned to be at least partially located in the cavity at a top to the bottom locker, and
 the receiving of the other article in the bottom locker including at least receiving the other article at least partially in the cavity of the bottom locker, such that a user of the top locker cannot access the article.

22. A method of making a locker for providing household services to a user by company comprising:

attaching a back panel, a top panel, a bottom panel, a first side wall, and a second side wall to form a shell of the locker;
attaching a divider at an angle to divide the locker into top compartment and bottom compartment, the divider forming a ceiling of the bottom compartment, which is slanted with respect to the sidewalls, and the divider forming a floor of the top compartment, which is also slanted with respect to the sidewalls;
attaching a top door to a top portion of the locker for opening and closing the top compartment;
attaching a bottom door to a bottom portion of the locker for opening and closing the bottom compartment; and
attaching a front panel for the top compartment, covering at least a portion of the top compartment that extends to a lower half of the locker system, the front panel for the top compartment being located just behind the bottom door in a closed position, the front panel for the top compartment thus restricts access to the top locker, from the lower half of the locker system when the bottom door is in an open position.

23. A locker system comprising:

a top compartment formed by at least
 sidewalls, and
 a floor, the floor being slanted with respect to the sidewalls; and
a bottom compartment that is located below the top compartment formed by at least
 the sidewalls, and
 a ceiling, the ceiling being slanted, the ceiling of the bottom compartment being formed from the floor of the top compartment;
a top door for opening and closing the top compartment;
a bottom door for opening and closing the bottom compartment;
a cavity located at the bottom of the top compartment, the bottom door covering a portion of the cavity in the top compartment, the cavity in the top compartment is not accessible from the bottom compartment; and a cavity located at a top of the bottom compartment, the top door covering a portion of the cavity in the bottom compartment, the cavity in the bottom compartment is not accessible from the top compartment.

24. A locker system comprising:

a top compartment formed by at least
- sidewalls, the sidewalls being rigidly attached, and
- a floor, the floor being slanted with respect to the sidewalls; and a bottom compartment that is located below the top compartment formed by at least the
- sidewalls, the sidewalls being rigidly attached;
- a ceiling, the ceiling being slanted, the ceiling of the bottom compartment being formed from the floor of the top compartment;
- a top door for opening and closing the top compartment;
- a bottom door for opening and closing the bottom compartment;
- a front panel covering at least a portion of the bottom compartment that extends to an upper half of the locker system, the front panel being located just behind the top door when the top door is in a closed position; the front panel restricts access to the bottom locker, from the upper half of the locker system, when the top door is in an open position.

* * * * *